(12) United States Patent
Kurachi et al.

(10) Patent No.: US 9,773,614 B2
(45) Date of Patent: Sep. 26, 2017

(54) THIN FILM CAPACITOR

(71) Applicant: TDK CORPORATION, Tokyo (JP)

(72) Inventors: Katsuyuki Kurachi, Tokyo (JP); Tatsuo Namikawa, Tokyo (JP); Junji Aotani, Tokyo (JP); Yuuki Aburakawa, Tokyo (JP); Shigeaki Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/803,560

(22) Filed: Jul. 20, 2015

(65) Prior Publication Data

US 2016/0027579 A1  Jan. 28, 2016

(30) Foreign Application Priority Data

Jul. 24, 2014 (JP) ................. 2014-150772

(51) Int. Cl.
| | |
|---|---|
| *H01G 4/30* | (2006.01) |
| *H01G 4/12* | (2006.01) |
| *H01G 4/33* | (2006.01) |
| *H01G 4/015* | (2006.01) |
| *H01G 4/224* | (2006.01) |

(52) U.S. Cl.
CPC ............. *H01G 4/12* (2013.01); *H01G 4/015* (2013.01); *H01G 4/224* (2013.01); *H01G 4/33* (2013.01)

(58) Field of Classification Search
CPC .................... H01G 4/30; H01G 4/306
USPC ............................. 361/301.4, 311
See application file for complete search history.

(56) References Cited

U.S. PATENT DOCUMENTS

| | | | | |
|---|---|---|---|---|
| 6,845,002 B2* | 1/2005 | Moriwake | ............... | B32B 18/00 361/302 |
| 7,675,756 B2* | 3/2010 | Moon | ................... | H05K 1/162 174/256 |
| 2003/0219956 A1* | 11/2003 | Mori | ..................... | H05K 1/162 438/393 |
| 2004/0130849 A1* | 7/2004 | Kurihara | ................ | H01G 4/228 361/311 |
| 2004/0183147 A1 | 9/2004 | Togashi et al. | | |
| 2008/0186654 A1* | 8/2008 | Takeshima | ............. | H01G 4/232 361/313 |
| 2009/0034162 A1* | 2/2009 | Yawata | ................ | H01G 9/0032 361/523 |
| 2013/0194714 A1* | 8/2013 | Nakaiso | .............. | H01L 23/5223 361/301.2 |
| 2015/0279823 A1* | 10/2015 | Haba | ..................... | H01L 25/105 257/777 |

FOREIGN PATENT DOCUMENTS

| | | | |
|---|---|---|---|
| JP | h0722725 | † | 1/1995 |
| JP | 2004214589 | † | 7/2004 |
| JP | 2004-335963 A | | 11/2004 |
| JP | 2012-099529 A | | 5/2012 |
| WO | WO 2012036017 A1 * | 3/2012 | ......... H01L 23/5223 |

\* cited by examiner
† cited by third party

*Primary Examiner* — Eric Thomas
(74) *Attorney, Agent, or Firm* — Oliff PLC (57) ABSTRACT

A thin film capacitor includes a pair of electrode layers, a dielectric layer existing between the pair of electrode layers, and a ceramic layer disposed on a surface opposite to the dielectric layer of at least one of the electrode layers.

14 Claims, 5 Drawing Sheets

Fig.5

THIN FILM CAPACITOR

TECHNICAL FIELD

The present invention relates to a dielectric thin film element including a thin film dielectric material, in particular, to a dielectric thin film element suitable for a thin film capacitor.

BACKGROUND

For various information processing apparatuses such as personal computers or mobile phones, it is required to surface mount, as electronic components, capacitors, inductors, varistors, or a complex part of these on a circuit board to install the electronic components with high density and to downsize the circuit board as a whole. This promotes the reduction of thin film capacitors in profile. The reduction of thin film capacitors in profile allows circuit boards to be highly integrated, which broadens the field of application, bringing many advantages.

Since a ceramic material forming a dielectric layer of a thin film capacitor involves electrostrictive effects, a mechanical strain according to an applied voltage is generated. For this reason, when an AC voltage is applied to a thin film capacitor, the thin film capacitor vibrates due to the electrostrictive effects of the dielectric layer thereof. By the vibration of the thin film capacitor due to the electrostrictive effects, vibration sound (hereafter, referred to as noise) is generated.

In conventional ceramic capacitors, as a technique to suppress noise, a technique and the like are known in which a metal terminal is disposed on a side face of a ceramic capacitor element to increase the total length from a substrate to a terminal electrode, so as to efficiently suppress the propagation of generated noise to the substrate (Patent Literature 1). In addition, there are a technique and the like to enhance the spring property of a metal terminal, so as to further reduce noise (Patent Literature 2).

CITATION LIST

Patent Literature

Patent Literature 1: Japanese Patent Application Laid-Open No, 2012-99529
Patent Literature 2: Japanese Patent Application Laid-Open No, 2004-335963

SUMMARY

The technique of Patent Literature 1 being a conventional technique is effective when a ceramic capacitor has a sufficient thickness, but it is found that the technique is insufficient, as the effect of suppressing noise, in device structures having thicknesses of 100 μm or smaller that are supposed as thin film capacitors. In addition, also in the technique of Patent Literature 2, it is found that the enhancement of the spring property of a metal terminal is often difficult when the thickness of the capacitor is small because it is necessary to change the height of the capacitor to enhance the spring property of the metal terminal.

The present invention is made in view of the above problem and has an object to enhance the effect of suppressing vibration generated in a capacitor that is sufficiently reduced in thickness.

The thin film capacitor according to the present invention includes a pair of electrode layers, a dielectric layer that is sandwiched between the pair of electrode layers, and a ceramic layer (an electrode holding layer) that is provided on a surface opposite to the dielectric layer of at least one of the electrode layers. With such a configuration, in the thin film capacitor, the electrode layer hardly vibrates by the ceramic layer, and the vibration of the thin film capacitor is suppressed.

The ceramic layer according to the present invention may be provided with, on the ceramic layer, a resin layer having a Young's modulus of 5 GPa or lower. With such a structure, even when distortion or stress is generated in the ceramic layer, since the distortion or stress is hardly transmitted to the electrode layers, further efficiently suppressing the vibration of the thin film capacitor.

A ceramic layer relating to the present invention may be a polycrystal. By being a polycrystal, grain boundaries allows the propagation of vibration to be efficiently scattered.

In addition, a ceramic layer relating to the present invention may be porous. By being porous, vibration is efficiently absorbed, enhancing the effects of the present invention.

In the thin film capacitor according to the present invention, the above surface opposite to the dielectric layer of the above at least one of the electrode layers may have a surface roughness Ra of 1 μm or higher. Having a surface roughness of 1 μm or higher allows vibration to be further easily absorbed, increasing the effects of the present invention. Note that the surface roughness herein is Ra defined in JIS B 0601 (1994) and JIS B 0031 (1994).

Thin film capacitors according to the present invention can suppress vibration or noise due to electrostrictive effects of the dielectric layer. Thus, it is possible to provide a thin film capacitor that can suppress the destruction or removal of an electrode layer and has a high moisture-proof property.

DETAILED DESCRIPTION

Hereafter, preferred embodiments of the present invention will be described. Note that the present invention is not limited to the following embodiments.

First Embodiment

Figure 1:
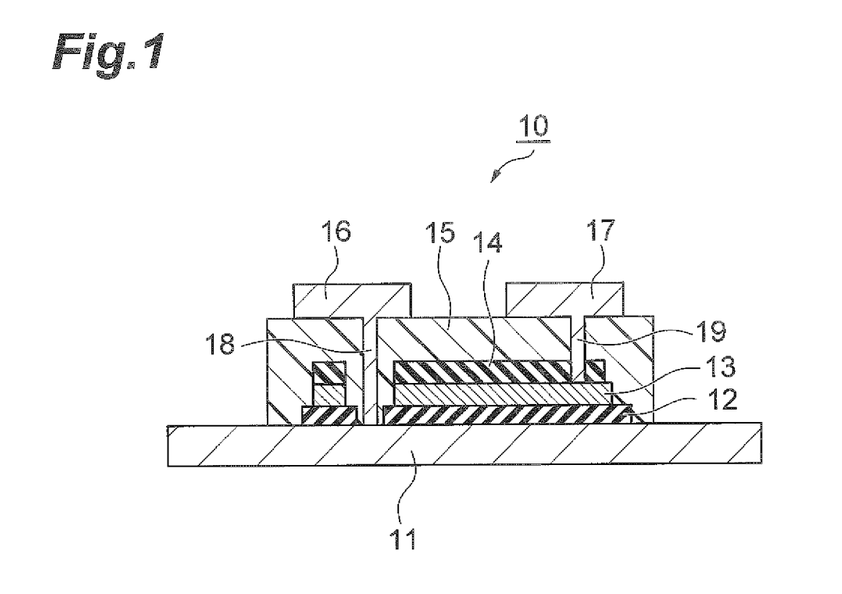
FIG. 1 is a schematic cross-sectional view showing the structure of a thin film capacitor in one embodiment (a first, third, or fourth embodiment) of the present invention.

FIG. 1 is a schematic cross-sectional view showing a thin film capacitor in the present embodiment. A thin film capacitor 10 includes a base electrode 11, a dielectric layer 12 that is laminated on this base electrode 11, an upper electrode layer 13 that is laminated on the dielectric layer 12, a ceramic layer 14 that is laminated on the upper electrode layer, the ceramic layer 14 having an electrode holding function, a protective layer 15 with which the dielectric layer 12, the upper electrode layer 13, and the ceramic layer 14 are covered, the protective layer 15 functioning as the surface protecting coat of these, a terminal electrode 16 for a lower electrode, a terminal electrode 17 for an upper electrode, a lower electrode via 18, and an upper electrode via 19.

The material of the base electrode 11 is not limited in particular as long as the material has conductivity. As the material of the base electrode 11, a metal, oxide, organic electrical conducting material, or the like can be selected as appropriate. Materials having high electric conductivities include materials that contain at least one of a Ni, Pt, Pd, Ir, Ru, Rh, Re, Os, Au, Ag, Cu, $IrO_2$, $RuO_2$, $SrRuO_3$, and $LaNiO_3$. The film thickness of the base electrode 11 is preferably 50 to 2000 nm in terms of electric conductivity and mechanical strength. If the film thickness is below 50 nm, the electric resistance of the base electrode 11 increases, which may deteriorate the electric property of the thin film capacitor. If the film thickness exceeds 2000 nm, the pressure that the internal stress of the base electrode 11 exerts on the dielectric layer 12 tends to be remarkable. The base electrode 11 may be provided on a substrate (not shown) of a Si or an alumina, but the base electrode 11 may also have a function of a substrate. In this case, the base electrode 11 and the substrate are made of the same material. For example, a foil or a plate the main component of which is a base material such as an Ni, Cu, and Al, or alloys of these, or a plate or a foil made of a stainless steel, Inconel®, or the like can be preferably used. In particular, Ni foils are preferable because they have high conductivities as well as high hardnesses and Young's moduli, contributing to the shape maintenance of the protective layer 15. The thickness of the base electrode 11 in the case where the base electrode 11 and the substrate have the same material is preferably 5 µm to 500 µm. If the thickness of the base electrode 11 is below 5 µm, the mechanical strength of the base electrode 11 may be below a strength at which a shape of the protective layer 15 can be maintained. In contrast, if the thickness of the base electrode 11 exceeds 500 µm, the accumulation amount of distortion due to thermal history that is unavoidable in a thin film capacitor manufacturing process may be increased, exerting an adverse effect on the shape maintenance of the protective layer 15. In the present embodiment, an aspect in which a Ni foil is used for the base electrode 11 will be described. The base electrode 11 being a Ni foil has both of a function as a holding member that holds the dielectric layer 12, the upper electrode layer 13, and the like, and a function as a lower electrode. Note that, in the case of a form having a substrate/electrode film structure, a structure in which substrates/electrode films are combined can be converted to the base electrode 11 and used in an embodiment the present invention.

The dielectric layer 12 is made of a dielectric material, and as the dielectric material, perovskite oxides expressed by the composition formula $ABO_3$, such as a barium titanate ($BaTiO_3$, hereafter referred to as "BT"), a barium strontium titanate (($BaSr)TiO_3$, hereafter referred to as "BST"), a strontium titanate ($SrTiO_3$, hereafter, referred to as "ST"), a calcium zirconate ($CaZrO_3$, $(BaSr)(TiZr)O_3$, hereafter referred to as "CZ"), and $BaTiZrO_3$, are preferably used. The dielectric layer 12 may be made of a composite material that contains one or more of these oxides or may be a laminated body of a plurality of dielectric layers. The film thickness of the dielectric layer 12 is preferably about 100 to 2000 nm, in terms of the function and maintaining the mechanical strength of the dielectric element.

If a Li (lithium), Ta (tantalum), Mn (manganese), or the like is added, as an additive, to the material of this dielectric layer 12, the same effects can be obtained.

The forming method for the dielectric layer 12 is not limited in particular, and a well-known dielectric thin film manufacturing method can be selected therefor as appropriate. For example, physical vapor depositions such as a sputtering method and vapor deposition method may be used, or chemical vapor depositions such as a plasma CVD method may be used. Alternatively, a solution method involving the application of a solution containing a starting material and calcination may be used.

The material of the upper electrode layer 13 is not limited in particular as long as the material has conductivity. As the material of the upper electrode layer 13, a metal, oxide, organic electrical conducting materials, or the like can be selected as appropriate. Materials having high electric conductivities include materials that contain at least one of a Ni, Pt, Pd, Ir, Ru, Rh, Re, Os, Au, Ag, Cu, $IrO_2$, $RuO_2$, $SrRuO_3$, and $LaNiO_3$. In particular, conductive materials configured to contain a Cu, Ni, Pt, Pd, Ir, Ru, Rh, Re, Os, Au, or Ag as a main component are preferable, and above all, conductive materials configured to contain a Ni as a main component are preferable in terms of electrical property and mechanical strength. For the upper electrode layer 13, a Ni is not necessarily used as a single element, and for example, the upper electrode layer 13 may have a laminated structure such as Ni/Cu. In this case, it is possible to bring the Ni layer side of the upper electrode layer 13 into contact with the dielectric layer 12 side, and a Cu side is made an outside portion. Furthermore, since the conductivity of Cu is higher than that of Ni, the conductivity of the upper electrode layer 13 can be increased by making the thickness of Cu larger than that of Ni.

The material of the ceramic layer 14 is not limited in particular as long as the material is a ceramic material, and AlN, $Si_3N_4$, $Al_2O_3$, $ZrO_2$, MgO, TiC, or the like can be selected as appropriate because they have good mechanical strengths with the electrode layer. For the forming method for the ceramic layer 14, physical vapor depositions such as a sputtering method and a vapor deposition method may be used, or chemical vapor depositions such as a plasma CVD method may be used. The film thickness of the ceramic layer 14 is preferably 100 nm to 5000 nm. If the film thickness is 100 nm or smaller, the effects of the present invention are hardly obtained, or if the film thickness is 5000 nm or larger, distortion or stress becomes excessively large to deform the electrode layer, which is unsuitable. The ceramic layer 14 has a function of holding the upper electrode layer 13.

For the protective layer 15, materials having Young's moduli of 0.1 GPa or higher and 2.0 GPa or lower can be selected as appropriate. For example, insulating resins such as a polyimide-based resin, epoxy-based resin, phenol-based resin, benzocyclobutene-based resin, polyamide-based resin, and fluorocarbon resin can be preferably used. In particular, polyimide-based resins are preferable due to their small moisture absorbencies and water absorptions. The Young's moduli of these materials can be controlled using well-known means for adjusting the mechanical properties of polymer materials. For example, the following means can be used: (1) introducing an alkyl group into a side chain or a molecular chain; (2) introducing a sulfur into a molecular chain (vulcanization); (3) reducing crosslinking points (changing an oxygen group in a molecular chain into a hydrogen termination); and (4) restricting polymerization reaction by charging a polymerization inhibitor in the middle of reaction.

The Young's modulus of the protective layer 15 can be measured by a nanoindentation method. A nanoindenter used in the nanoindentation method is known as a technique in which an indenter is pressed to evaluate the mechanical properties of thin films, whereas it is required to, in the mechanical strength evaluation of a thin film itself, obtain a load-displacement curve with a maximum indentation depth to such an extent that the thin film is not influenced by the base. The above-described Young's modulus of the protective layer 15 is desirably a result of calculation based on a load-displacement curve that is obtained, in consideration of the influence of the base, with a maximum indentation depth being about $1/5$ to $1/3$ of the film thickness of the protective layer 15. More specifically, a preparatory measurement should be performed at low loads such as loads of about 20 mN to 100 mN.

For the terminal electrode 16 for the lower electrode, the terminal electrode 17 for the upper electrode, the lower electrode via 18, and the upper electrode via 19, materials having high conductivities can be selected as appropriate. For example, Au, Ag, Pt, Cu, and the like, or alloys having these as main components. In terms of combining mechanical property and electric conductivity, materials configured to have a Cu as a main component are preferable. In an outer layer of a terminal electrode, a layer of Au, Ni, Sn, Pd, and the like may be provided.

Second Embodiment

Figure 2:
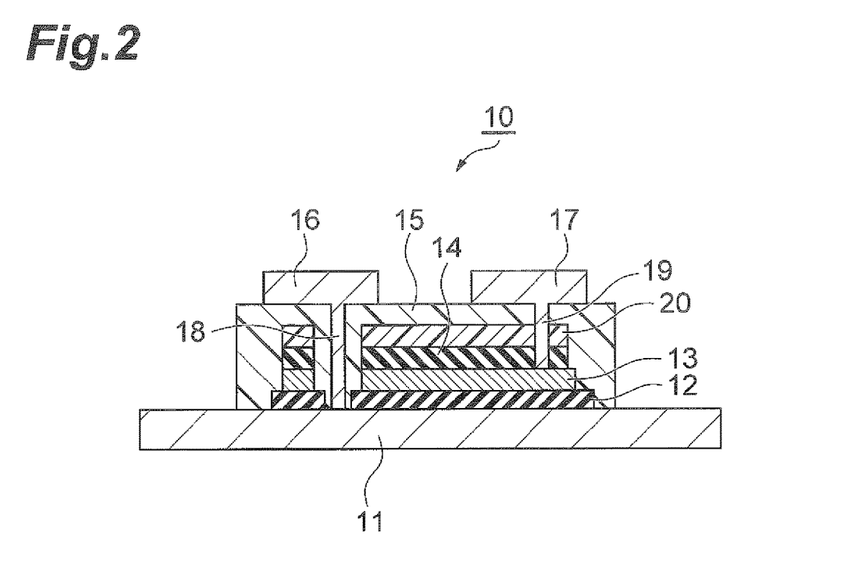
FIG. 2 is a schematic cross-sectional view showing the structure of a thin film capacitor in one embodiment (a second embodiment) of the present invention.

FIG. 2 is a schematic cross-sectional view showing the structure of a thin film capacitor in a second embodiment. In the second embodiment, the thin film capacitor includes, on the ceramic layer 14, a resin layer 20 having a Young's modulus of 5 GPa or lower. For this resin, a thermosetting resin such as a polyimide-based resin, phenol-based resin, and epoxy-based resin can be selected as appropriate. With thermosetting resins having Young's moduli of 5 GPa or lower, the effect of cushioning distortion or stress of ceramic material can be produced, and the mechanical strength of the ceramic layer 14 is thereby further obtained. The Young's modulus of the resin layer 20 is higher than the Young's modulus of the protective layer 15, more specifically, can be higher than 2.0 GPa or 2.0 GPa or higher. The thickness of the resin layer 20 can be, for example, 0.1 to 5.0 μm. The dielectric layer 12, the upper electrode layer 13, the ceramic layer 14, and the resin layer 20 are covered with the protective layer 15.

Third Embodiment

In a third embodiment, a thin film capacitor in which the ceramic layer 14 is made of a polycrystal will be disclosed. With a polycrystal, the effect of further suppressing the propagation of vibration can be produced. This is because the vibration is made scattered at many grain boundaries in the ceramic layer 14. As the material of the ceramic layer 14 in this case, AlN, $Al_2O_3$, $ZrO_2$ can be used. In addition, the sizes of crystal particles constituting the polycrystal can be 0.2 μm to 10 μm. The sizes of crystal particles can be controlled by changing a growth rate.

In this case, the forming method of the ceramic layer 14 is preferably a sputtering method, solution method, or the like, and increasing a formation temperature allows the ceramic layer 14 to be easily oriented to be a polycrystal.

Fourth Embodiment

In a fourth embodiment, a thin film capacitor in which the ceramic layer 14 is porous will be disclosed. In porous cases, the efficiency of absorbing vibration is further increased, enhancing the effects of the present invention. In this case, the forming method of the ceramic layer 14 is preferably a solution method involving the application of a solution containing a starting material and calcination. By controlling a temperature or a period of the application of the solution and the calcination, the porous ceramic layer 14 can be obtained.

Fifth Embodiment

Figures 3A, 3B:
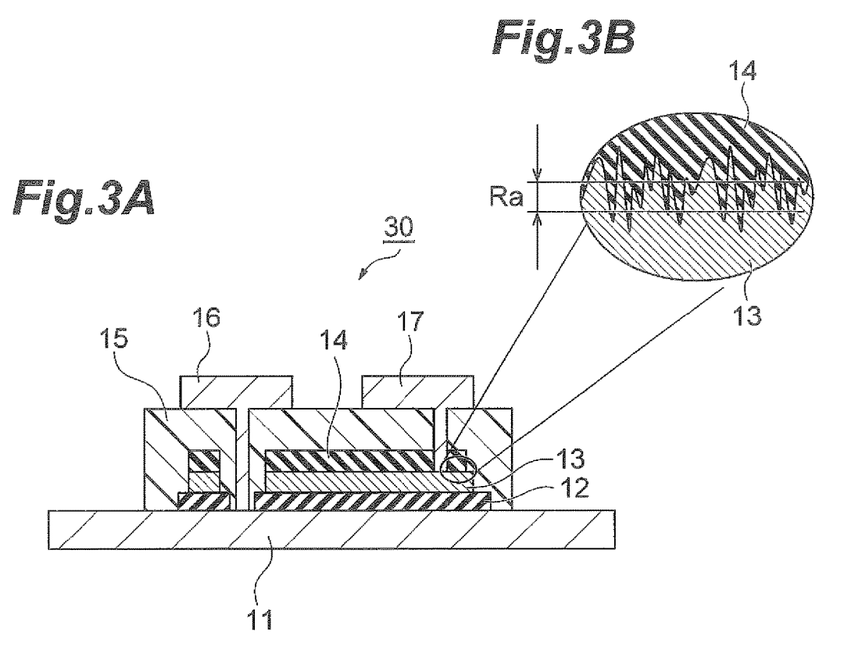
FIG. 3A is a schematic cross-sectional view showing the structure of a thin film capacitor in one embodiment (a fifth embodiment) of the present invention.
FIG. 3B is an enlarged view of the interface between a dielectric layer 13 and a ceramic layer 14.

In a fifth embodiment, a thin film capacitor in which projections and depressions for absorbing vibration are provided on the surface of an upper electrode layer 33 will be disclosed. FIG. 3A is a schematic cross-sectional view showing the structure of a thin film capacitor in the present embodiment. A thin film capacitor 30 is configured to include a base electrode 11, a dielectric layer 12 that is laminated on this base electrode 11, an upper electrode layer 13 that is laminated on the dielectric layer 12, a ceramic layer 14 that is laminated on the upper electrode layer, a protective layer 15 as a surface protecting coat, and terminal electrodes 16 and 17. In addition, the projections and depressions, expressed by a surface roughness Ra, on a surface of the upper electrode layer 13 to which the ceramic layer 14 is in contact are shown in an enlarged portion in FIG. 3B. This Ra is an arithmetic mean roughness, and for the calculation thereof, calculation formulae defined in JIS B 0601 (1994) and JIS B 0031 (1994) are used.

The existence of the projections and depressions (the surface roughness Ra) of 1 μm or larger on the surface of the upper electrode layer 13 to be the base of the ceramic layer 14 allows vibration to be further absorbed, enhancing the effects of the present invention. The film thickness of the ceramic layer 14 is preferably 2000 nm to 5000 nm. If the film thickness is below 2000 nm, the effects of the present invention are hardly produced, or if the film thickness is 5000 nm or larger, distortion or stress becomes excessively large, which is unsuitable.

The ceramic layer 14 is easily oriented to be a polycrystal due to the existence of the projections and depressions (the surface roughness Ra) of 1 μm or larger on the upper electrode layer 13 on the surface, which allows many grain boundaries to be developed, further enhancing the effects of the present invention.

Hereafter, the present invention will be described more specifically based on Examples and Comparative Examples, but the present invention is not limited to the following Examples.

Examples 1, 2, 4

Figure 4A:
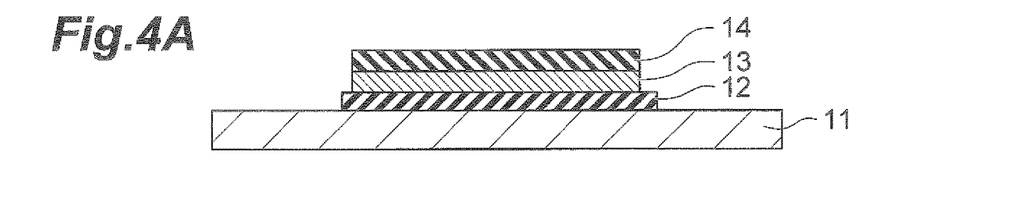
FIG. 4A to FIG. 4E are schematic cross sections showing a manufacturing method of a thin film capacitor in one embodiment of the present invention.

A thin film capacitor as shown in FIG. 1 was manufactured. As shown in FIG. 4A, a Ni foil having a thickness of 100 μm was prepared as the base electrode 11, on one side of which a ST layer being the dielectric layer 12 was formed by a sputtering method so as to have a permittivity (relative permittivity) of 1000 and a film thickness of 800 nm. On the dielectric layer 12, a Ni layer being the upper electrode layer 13 (the lower layer thereof on the dielectric layer 12 side)

was formed by a sputtering method, and on the Ni layer, a Cu layer being the upper electrode layer 13 (the upper layer thereof) was formed by a sputtering method. In addition, on the Cu layer, as the ceramic layer 14, an $Al_2O_3$ was formed in Example 1, or an AlN was formed in Examples 2 and 4, by a sputtering method. The operation was performed at deposition temperatures at that point of 400° C. in Examples 1 and 2 and 500° C. in Example 4. It was confirmed that the resulting ceramic layer 14 was an amorphous $Al_2O_3$ containing microcrystals (Example 1), an amorphous AlN (Example 2), or a polycrystalline AlN (Example 3) by an X-ray diffraction method. At that point, the area and pattern shape of the upper electrode layer 13 and the thickness of the dielectric layer 12 were set such that the capacitance of the thin film capacitor was about 8000 pF (8 nF) (refer to FIG. 4A).

Figure 4B:
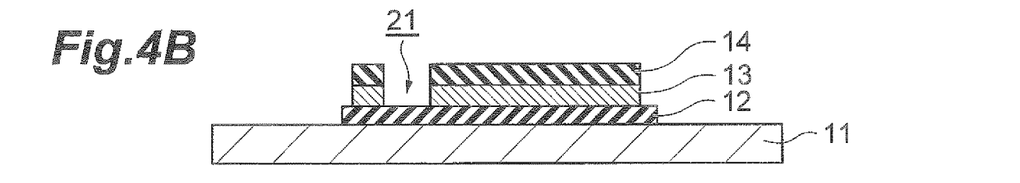

After the formation of the dielectric layer 12, the upper electrode layer 13, and the ceramic layer 14, heat treatment was performed. On the ceramic layer 14 after the heat treatment, a resist layer having an opening 21 where a connection to the base electrode 11 was to be made, was formed. The shape of the opening 21 was made a square on a mask pattern and made to have a size of 150 μm×150 μm on the mask pattern. Subsequently, the ceramic layer 14 at the opening 21 was etched using a $CF_4$ gas with a Reactive Ion Etching device (hereafter, referred to as an RIE). Next, the upper electrode layer 13 was removed by etching with a ferric chloride solution. Subsequently, the resist layer was removed (refer to FIG. 4B).

Figure 4C:
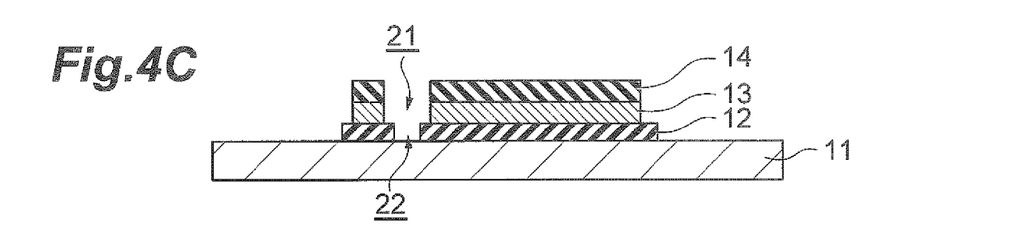

On the dielectric layer 12 exposed at the position of the opening 21, a resist layer having an opening 22 was further formed. The shape of the opening 22 was made a square on a mask pattern and made to have a size of 100×100 μm on the mask pattern. Subsequently, the dielectric layer 12 at the opening 22 was etched using a mixed solution of a hydrochloric acid and an aqueous solution of ammonium fluoride. Subsequently, the resist layer was removed, and heat treatment was performed (refer to FIG. 4C).

Figure 4D:
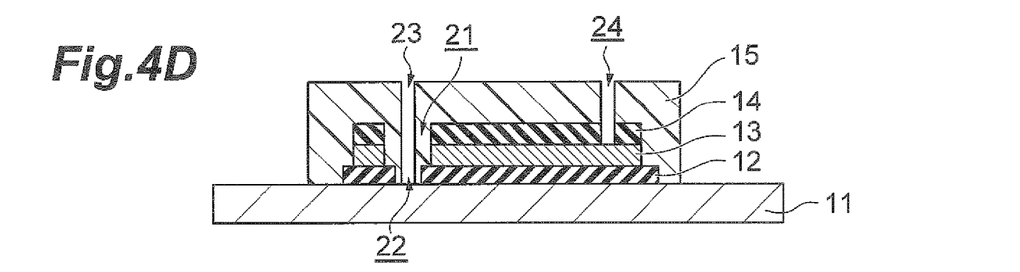

The protective layer 15 was formed using a polyimide resin having photosensitivity. In advance of the formation of the protective layer 15, the following preparatory test was conducted. As materials of a polyimide resin, a material was prepared that was obtained by mixing: (1) a normal polyimide monomer; and (2) a polyimide monomer bound to an alkyl group. Three kinds of preparatory test specimen having different mixing ratios between these monomer (1) and monomer (2) were prepared, and the Young's moduli thereof were measured with a nanoindentation system (made by Hysitron). In the measurements, 100 load-displacement curves were calculated for each sample under a condition of a maximum load of 20 mN, Young's moduli were calculated to calculate the average value thereof. Note that a maximum displacement was about ¼ or smaller, of a 6 μm film thickness of the protective layer 15, from the surface thereof, and no influence of the base electrode 11 was recognized. As a result of the measurements, the Young's moduli of the protective layer 15 shows three levels: 0.1 GPa, 1.0 GPa, and 2.0 GPa, and it was confirmed that the Young's modulus of the protective layer 15 can be controlled by mixing different polyimide monomers. Based on the above result of the preparatory test, the protective layer 15 is formed so as to have a Young's modulus of 2.0 GPa. On the formed protective layer 15, by photolithography, an opening 23 was further provided inside the opening 22, and another opening 24 was provided at a site in the protective layer 15 and the resin layer on the upper electrode layer 13 where the opening 21 is absent. The shapes of the opening 23 and the opening 24 were made squares on a mask pattern and made to have a size of 50×50 μm on the mask pattern (refer to FIG. 4D).

Figure 4E:
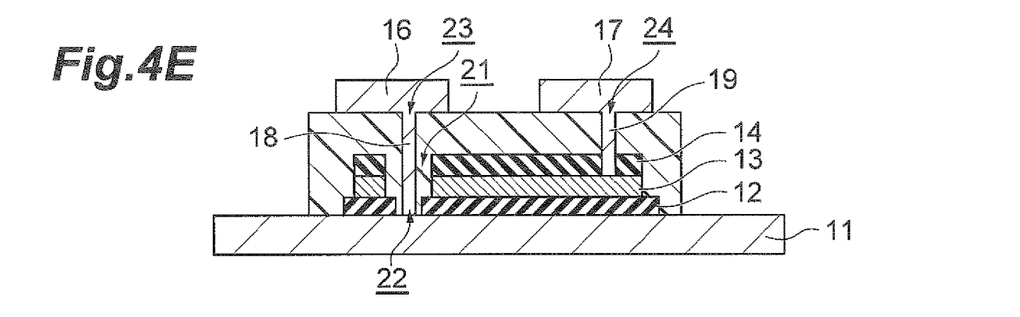

Through the above procedure, a thin film capacitor body was obtained. On the thin film capacitor body, the terminal electrode 16 for the lower electrode, the terminal electrode 17 for the upper electrode, the lower electrode via 18, and the upper electrode via 19 were formed using a Cu. At that point, they were connected to the base electrode 11 and the upper electrode layer 13 through the opening 23 and the opening 24 exposed in the protective layer 15, respectively, and the terminal electrode 16 for the lower electrode and the terminal electrode 17 for the upper electrode are were formed into shapes that overlap the protective layer 15 (refer to FIG. 4E). Through the above procedure, thin film capacitors 10 were obtained. When the average value and the standard deviation of capacitances were calculated for the obtained thin film capacitors 10, the average value was 8.05 nF, and the standard deviation was 0.2 nF. In addition, when the insulation resistance value thereof was measured, it was within a range from $1.0\times10^{11}$ to $2.0\times10^{11}\Omega$.

Examples 5, 8

A thin film capacitor as shown in FIG. 1 was formed. A Ni foil having a thickness of 100 μm was prepared as the base electrode 11, on one side of which a BT layer being the dielectric layer 12 was formed by a sputtering method so as to have a permittivity of 1000 and a film thickness of 800 nm. On the dielectric layer 12, a Ni layer being the upper electrode layer 13 (the lower layer thereof on the dielectric layer 12 side) was formed by a sputtering method, and on the Ni layer, a Cu layer being the upper electrode layer 13 (the upper layer) was formed by a sputtering method. In addition, on the Cu layer, as the ceramic layer 14, an $Al_2O_3$ was formed in Example 5, and an AlN was formed in Example 8, by a solution method. Subsequently, the operation was performed at a calcination temperature of 550° C., in Example 5, and of 650° C. in Example 8. At that point, the area and pattern shape of the upper electrode layer 13 and the thickness of the dielectric layer 12 were set such that the capacitance of the thin film capacitor was about 8000 pF (8 nF).

After the formation of the dielectric layer 12, the upper electrode layer 13, and the ceramic layer 14, thin film capacitors 10 were manufactured by the same procedure as in Example 1.

Examples 3, 6, 7

A thin film capacitor as shown in FIG. 2 was manufactured. A Ni foil having a thickness of 100 μm as the base electrode 11, on one side of which a BT layer being the dielectric layer 12 was formed by a sputtering method so as to have a permittivity of 1000 and a film thickness of 800 nm. On the dielectric layer 12, a Ni layer being the upper electrode layer 13 (the lower layer thereof on the dielectric layer 12 side) was formed by a sputtering method, and on the Ni layer, a Cu layer being the upper electrode layer 13 (the upper layer thereof) was formed by a sputtering method. In addition, on the Cu layer, as the ceramic layer 14, an $Al_2O_3$ was formed, by a sputtering method in Examples 3 and 6 and by a solution method in Example 7. Deposition temperatures at the point were 400° C. in Example 3 and 500° C. in Example 6. The calcination temperature in Example 7 was set to 650° C. Subsequently, as the resin layer 20 (Young's modulus: 3.0 GPa), a polyimide resin was applied with a spin coater and cured at 230° C./1 hour. At that point, the area and pattern shape of the upper electrode layer 13 and the thickness of the dielectric layer 12 were set such that the capacitance of the thin film capacitor was about 8000 pF (8 nF).

After the formation of the dielectric layer 12, the upper electrode layer 13, the ceramic layer 14, and the resin layer 20, thin film capacitors 10 were manufactured by the same procedure as in Example 1.

Example 9

A thin film capacitor as shown in FIGS. 3A and 3B was manufactured. A Ni foil having a thickness of 100 μm was prepared as the base electrode 11, on one side of which a BT layer being the dielectric layer 12 was formed by a sputtering method so as to have a permittivity of 1000 and a film thickness of 800 nm. On the dielectric layer 12, a Ni layer being the upper electrode layer 13 (the lower layer thereof on the dielectric layer 12 side) was formed by a sputtering method, and on the Ni layer, a Cu layer being the upper electrode layer 13 (the upper layer thereof) was formed by a sputtering method. The surface of this Cu layer was etched using an Ar gas with an RIE such that Ra=1 μm was satisfied. In addition, on the Cu layer, as the ceramic layer 14, an AlN was formed by a solution method. The calcination temperature at that point was set to 650° C. At that point, the area and pattern shape of the upper electrode layer 13 and the thickness of the dielectric layer 12 were set such that the capacitance of the thin film capacitor was about 8000 pF (8 nF).

After the formation of the dielectric layer 12 and the upper electrode layer 13, the ceramic layer 14, and the resin layer 20, thin film capacitors 30 were manufactured by the same procedure as in Example 1.

Example 10

A thin film capacitor including an upper electrode layer the surface of which has a surface roughness Ra in FIG. 2 was manufactured. A Ni foil having a thickness of 100 μm was prepared as the base electrode 11, on one side of which a BT layer being the dielectric layer 12 was formed by a sputtering method so as to have a permittivity of 1000 and a film thickness of 800 nm. On the dielectric layer 12, a Ni layer being the upper electrode layer 13 (the lower layer thereof on the dielectric layer 12 side) was formed by a sputtering method, and on the Ni layer, a Cu layer being the upper electrode layer 13 (the upper layer thereof) was formed by a sputtering method. The surface of this Cu layer was etched using an Ar gas with an RIE such that Ra=3 μm was satisfied. In addition, on the Cu layer, as the ceramic layer 14, an $Al_2O_3$ was formed by a solution method. The calcination temperature at that point was set to 650° C. Subsequently, as the resin layer 20 (Young's modulus: 3.0 GPa), a polyimide resin was applied with a spin coater and cured at 230° C./1 hour. At that point, the area and pattern shape of the upper electrode layer 13 and the thickness of the dielectric layer 12 were set such that the capacitance of the thin film capacitor was about 8000 pF (8 nF).

After the formation of the dielectric layer 12, the upper electrode layer 13, the ceramic layer 14, and the resin layer 20, heat treatment was performed. On the resin layer 20 after the heat treatment, a resist layer having an opening 21 where a connection to the base electrode 11 was to be made was formed. The shape of the opening 21 was made a square on a mask pattern and made to have a size of 150 μm×150 μm on the mask pattern. Subsequently, the ceramic layer 14 at the opening 21 was etched using a $CF_4$ gas with an RIE, and the polyimide (the resin layer 20) was etched using an $O_2$ gas. Next, the upper electrode layer 13 was removed by etching with a ferric chloride solution. Subsequently, the resist layer was removed.

After the formation of the dielectric layer 12 and the upper electrode layer 13, the ceramic layer 14, and the resin layer 20, thin film capacitors 30 were manufactured by the same procedure as in Example 1.

Comparative Example 1

Figure 5:
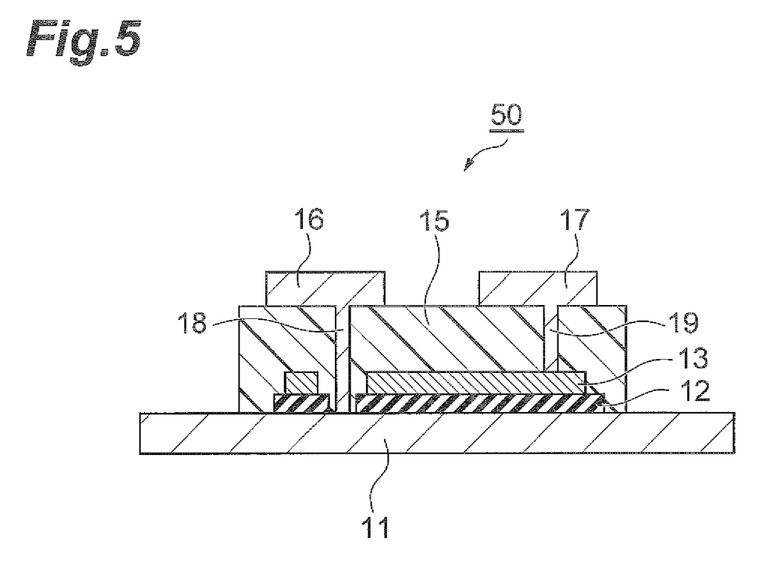
FIG. 5 is a schematic cross-sectional view showing the structure of a thin film capacitor in a comparative example of the present invention.

A thin film capacitor as shown in FIG. 5 was manufactured. A Ni foil having a thickness of 100 μm was prepared as the base electrode 11, on one side of which a BT layer being the dielectric layer 12 was formed by a sputtering method so as to have a permittivity of 1000 and a film thickness of 800 nm. On the dielectric layer 12, a Ni layer being the upper electrode layer 13 (the lower layer thereof on the dielectric layer 12 side) was formed by a sputtering method, and on the Ni layer, a Cu layer being the upper electrode layer 13 (the upper layer thereof) was formed by a sputtering method. At that point, the area and pattern shape of the upper electrode layer 13 and the thickness of the dielectric layer 12 were set such that the capacitance of the thin film capacitor was about 8000 pF (8 nF).

After the formation of the dielectric layer 12 and the upper electrode layer 13, thin film capacitors 50 were manufactured by the same procedure as in Example 1.

(Evaluation of Thin Film Capacitors)

A moisture-proof reliability test was conducted on thin film capacitors 10, 30, and 50. In the moisture-proof reliability test, the thin film capacitors 10, 30, and 50 were mounted on a printed-circuit board, the terminal electrodes of the thin film capacitors 10, 30, and 50 were connected to electrodes on the substrate side by wire bonding, which is put into a thermostatic chamber controlled at 60° C. and 90% RH, and an AC voltage of 4 Vrms was applied for 600 hours. The capacitance values of the thin film capacitors 10, 30, and 50 after a period of 200 hours, 400 hours, and 600 hours elapsed were measured with an AC voltage of 1 Vrms and 1 KHz, and at a room temperature. Thin film capacitors 10 and 30 the capacitance values of which fluctuated 5% or more with respect to the capacitance values before being put into the thermostatic chamber were determined to be NG, and the number of NGs was counted and determined as the result of evaluation.

As to the above Examples 1 to 10 and Comparative Example 1, the results of the moisture-proof reliability test are shown in Table 1. The results of the moisture-proof reliability test are shown in the form of "the number of not NGs/total number."

TABLE 1

| | Presence/ Absence of Ceramic Layer and Kind | Presence/ Absence of Resin Layer and Kind | Moisture-Proof Reliability | | |
|---|---|---|---|---|---|
| | | | 200 hrs | 400 hrs | 600 hrs |
| Comparative Example 1 | Absent | — | 20/100 | 9/100 | 2/100 |
| Example 1 | $Al_2O_3$ | Absent | 95/100 | 84/100 | 64/100 |
| Example 2 | AlN | Absent | 95/100 | 83/100 | 66/100 |
| Example 3 | $Al_2O_3$ | Polyimide | 100/100 | 89/100 | 78/100 |
| Example 4 | AlN | Absent | 100/100 | 91/100 | 82/100 |
| Example 5 | $Al_2O_3$ | Absent | 100/100 | 94/100 | 84/100 |

TABLE 1-continued

|  | Presence/<br>Absence<br>of Ceramic<br>Layer | Presence/<br>Absence<br>of Resin<br>Layer | Moisture-Proof<br>Reliability | | |
|---|---|---|---|---|---|
|  | and Kind | and Kind | 200 hrs | 400 hrs | 600 hrs |
| Example 6 | $Al_2O_3$ | Polyimide | 100/100 | 94/100 | 89/100 |
| Example 7 | $Al_2O_3$ | Polyimide | 100/100 | 100/100 | 92/100 |
| Example 8 | AlN | Absent | 100/100 | 98/100 | 91/100 |
| Example 9 | AlN | Absent | 100/100 | 100/100 | 93/100 |
| Example 10 | $Al_2O_3$ | Polyimide | 100/100 | 100/100 | 100/100 |

As shown in Table 1, by practicing the present invention, the moisture-proof reliability of a thin film capacitor are enhanced. It can be considered that, by practicing the present invention, the propagation of vibration due to noise is suppressed, and as a result, the development of a crack that brings the deterioration of a moisture-proof property can be suppressed. Therefore, the effect of suppressing the deterioration of a mechanical strength due to noise generated in a thin film capacitor herein is obvious.

What is claimed is:

1. A thin film capacitor comprising:
a pair of electrode layers,
a dielectric layer existing between the pair of electrode layers;
a ceramic layer disposed on a surface opposite to the dielectric layer of at least one of the electrode layers, and
a protective layer comprises an insulating resin covering the dielectric layer, the ceramic layer, and the at least one of the electrode layers,
wherein
the protective layer is in direct contact with the side face of the dielectric layer,
the dielectric layer comprises a perovskite oxide, and
the ceramic layer comprises AN, $Si_3N_4$, $Al_2O_3$, $ZrO_2$, MgO or TiC.

2. The thin film capacitor according to claim 1, further comprising, on the ceramic layer, a resin layer having a Young's modulus of 5 GPa or lower.

3. The thin film capacitor according to claim 2, wherein the resin layer has a higher Young's modulus than that of the protective layer.

4. The thin film capacitor according to claim 1, wherein the ceramic layer is a polycrystal.

5. The thin film capacitor according to claim 4, wherein the polycrystal comprises crystal particles having a size of 0.2 μm to 10 μm.

6. The thin film capacitor according to claim 1, wherein the ceramic layer is porous.

7. The thin film capacitor according to claim 1, wherein the surface opposite to the dielectric layer of the at least one of the electrode layers has a surface roughness Ra of 1 μm or higher.

8. The thin film capacitor according to claim 7, wherein the ceramic layer has a thickness of 2000 nm to 5000 nm.

9. The thin film capacitor according to claim 1, wherein the ceramic layer has a thickness of 100 nm to 5000 nm.

10. The thin film capacitor according to claim 1, wherein the protective layer has a Young's modulus of 0.1 GPa or higher and 2.0 GPa or lower.

11. The thin film capacitor according to claim 1, wherein the ceramic layer is amorphous $Al_2O_3$ containing monocrystals.

12. The thin film capacitor according to claim 1, wherein the ceramic layer is amorphous AlN.

13. The thin film capacitor according to claim 1, wherein the ceramic layer is polycrystalline AlN.

14. The thin film capacitor according to claim 1, wherein the protective layer is in direct contact with the side face of the electrode layer that is located above the dielectric layer.

* * * * *